(12) United States Patent
Gray

(10) Patent No.: US 6,173,817 B1
(45) Date of Patent: Jan. 16, 2001

(54) AUTOMATICALLY BRAKING DEVICE WHEN LEAVING A PROTECTED AREA

(76) Inventor: Andrew P. P. Gray, The Point, 11 Beadle Garth, Copmanthorpe, York Y023 3YJ (GB)

( * ) Notice: Under 35 U.S.C. 154(b), the term of this patent shall be extended for 0 days.

(21) Appl. No.: 09/155,762
(22) PCT Filed: Mar. 26, 1997
(86) PCT No.: PCT/GB97/00847
   § 371 Date: Oct. 5, 1998
   § 102(e) Date: Oct. 5, 1998
(87) PCT Pub. No.: WO97/37883
   PCT Pub. Date: Oct. 16, 1997

(30) Foreign Application Priority Data

Apr. 4, 1996 (GB) .................................................. 9607138

(51) Int. Cl.⁷ ...................................................... B60T 1/14
(52) U.S. Cl. .............................. 188/5; 188/111; 188/1.12; 188/69
(58) Field of Search ................................. 188/5, 111, 69, 188/167, 6, 7, 19, 31, 60, 62, 161, 110, 4 R, 1.12

(56) References Cited

U.S. PATENT DOCUMENTS

| | | | |
|---|---|---|---|
| 2,964,140 | * 12/1960 | Berezny | 188/111 |
| 3,031,038 | * 4/1962 | Chait | 188/111 |
| 3,434,571 | * 3/1969 | Shuler | 188/69 |
| 4,242,668 | * 12/1980 | Herzog | 188/69 X |
| 5,881,846 | * 3/1999 | French et al. | 188/1.12 |

\* cited by examiner

Primary Examiner—Douglas C. Butler
Assistant Examiner—Melanie Talavera
(74) Attorney, Agent, or Firm—Dykema Gossett PLLC (57) ABSTRACT

The present invention relates to a braking device for use with a vehicle which moves along a surface, the braking device being operated by an area of magnetic material, and is particularly, but not exclusively, for use with a wheeled trolley or cart to deter its removal from a designated area. The braking device comprises a first portion for mounting on the vehicle, a braking portion movable relative to the first portion from an inoperative position to an operative braking position in braking contact with the surface, and retaining portion for retaining the braking portion in its inoperative position. The retaining portion comprises a blocking portion and trigger portion, the trigger portion being movable between a primed position and a triggered position by passage in close proximity to the magnetic material, and in the primed position, holding the blocking portion in a blocking position preventing movement of the braking portion. In moving to its triggered position, the trigger portion releases the blocking portion to allow it to move to its unblocking position to allow movement of the braking portion to its braking position on passage of the device past the magnetic material. To prevent inadvertent release of the braking portions, the braking portion cooperates with the blocking portion to prevent movement of the blocking portion from its blocking position to its unblocking position in the absence of the magnetic material, cooperation being released by application of a force to the braking portion or the blocking portion.

11 Claims, 5 Drawing Sheets

AUTOMATICALLY BRAKING DEVICE WHEN LEAVING A PROTECTED AREA

BACKGROUND OF THE INVENTION

The present invention relates to a braking device for use with a vehicle which moves along a surface, the braking device being operated by means external to the vehicle, and particularly but not exclusively to a braking device for use with a wheeled trolley or cart to deter its removal from a designated area.

A particular problem with supermarket-type shopping trolleys or carts is the removal of these trolleys or carts from designated areas, such as the supermarket and/or its car park. Although various systems have been proposed for placing physical obstructions such as grids and/or narrow stalls at the exit points from these designated areas, which obstacles are intended to interact with the trolley's castor wheels or with the trolley itself to deter its removal, these known systems are easily overcome and are also unsuitable for certain applications, such as vehicle entrances for supermarket car parks.

A braking device designed to overcome these problems is described in International Patent Application No. WO92/15476. The device is designed to be activated as it passes over a member or area of magnetic material to cause a braking member to be applied to the ground to impede the trolley's continued movement. The braking device is conveniently associated with a castor wheel of the trolley. However, the environment of dust and heavy knocks which a trolley castor wheel has to withstand produces a weakness and unreliability in the locking and unlocking of this device. The present invention relates to an improvement of the type of device described in the above referred-to application.

SUMMARY OF THE INVENTION

According to one aspect of the present invention, there is provided a braking device for mounting on a vehicle movable alone a surface comprising a first portion for mounting on the vehicle, a braking portion movable relative to the first portion from an inoperative position to an operative braking position in braking contact with the surface, and retaining means for retaining the braking portion in its inoperative position the retaining means being operable by external means, for example comprising magnetic material, to release the braking portion, the braking portion and retaining means being adapted to cooperate to prevent operation of the retaining means to release the braking portion in the absence of the external means.

A portion of the retaining means may abut a surface of the braking portion in such a way that relative movement of the retaining means and braking portion are prevented, the cooperation between the braking portion and retaining means being removed by application of a force to one of the components.

The retaining means may include blocking means and trigger means, the trigger means being moveable between a primed position and a triggered position by passage in close proximity to the external means. In the primed position, the trigger means may hold the blocking means in a blocking position preventing movement of the braking portion and, in moving to the triggered position, the trigger means may release the blocking means to allow the blocking means to move to its unblocking position to allow movement of the braking portion to its braking position on passage of the device past the external means, the braking portion cooperating with the blocking means to prevent movement of the blocking means from its blocking position to its unblocking position in the absence of the external means.

The blocking means may include a portion having a surface on an end portion which, in the blocking position of the blocking means, abuts a surface of the braking portion such that the blocking means prevents movement of the braking portion to its braking position and the braking portion prevents movement of the blocking means to its unblocking position. The braking portion may be adapted to be moved by the presence of the external means in a direction opposite the direction of its movement to its braking position, so as to release cooperation between the blocking means and the braking portion to permit movement of the blocking means to its unblocking position.

The device may include a stabilizing element which, in the primed position of the trigger means bears against the blocking means in the region of its contact with the trigger means so that, when the trigger means moves to its triggered position, the stabilizing element engages the trigger means to hold it in its triggered position.

For releasing cooperation between the blocking means and the braking position, as an alternative to movement of the braking portion, the stabilizing element may be arranged to apply a force to the blocking means when the trigger means moves to its triggered position.

In relation to the foregoing and what follows, the term "magnetic material" is used to denote a material which is affected by a magnetic force and can either be a magnet or a permanently magnetised material or a material, e.g. mild steel, which is attracted to a magnet or permanently magnetised material. It will be understood that where there are two separate elements of "magnetic material" which are to interact, one element may be permanently magnetised or a magnet and the other element may be made of a material which is attracted to it or may be a magnet or permanently magnetised to either be attracted to it or repelled by it. In the following description the term "attracted" is used but it will be understood that in a correspondingly modified arrangement, the two elements may be repelled.

According to another aspect of the present invention, there is provided a braking device for braking a vehicle movable along a surface including a first portion mounted on the vehicle and a further or braking portion movable relative to the first portion between an inoperative position and an operative braking position for contacting the surface to brake the vehicle, blocking means mounted on the first portion for blocking movement of the braking portion to its operative position and trigger means movable between a primed position and a triggered position in which the blocking means is released to allow movement of the braking portion to its braking position, the trigger means being moved from its primed position to its triggered position by passage of the device in close proximity to magnetic material, wherein to prevent inadvertent operation of the device, the braking portion co-operates with the blocking means to prevent movement of the blocking means to its unblocking position in the absence of the said magnetic material.

Cooperation between the braking portion and the blocking means may be released either by applying a force to the braking portion or to the blocking means.

The trigger means preferably includes a member mounted on the first portion which is arranged to move from its primed position to its triggered position as it passes in close proximity to magnetic material, e.g. a magnetic material strip mounted in the surface over which the vehicle moves.

The member is advantageously pivotally mounted on the first portion and biassed to its primed position so that it will return to that position after operation. The trigger member may be pivotally mounted about its centre of gravity and biassed to its primed position by a spring. The member may be made of magnetic material or incorporate an element of magnetic material and may be generally elongate with one end closer to the surface over which the vehicle moves than the other.

The blocking means may also be pivotally mounted on the first portion.

The braking portion may include a member pivotally mounted on the first portion and arranged to be biassed by gravity towards its braking position. The member may have an eccentric circumferential surface portion which engages the surface over which the vehicle moves when the braking member is moved to its braking position. The member is arranged to pivot in a plane parallel to the direction of movement of the vehicle and in a direction such that continued movement of the vehicle will continue angular movement of the member to a position in which it moves the first portion away from the surface.

The blocking member in its blocking position may hold the braking member in its inoperative position against the bias of gravity. The contact surfaces of the blocking means and braking member are preferably arranged such that the blocking means is deterred from moving to its unblocking position while contact between it and the braking member is maintained. To enable the device to be operated the braking member may be caused to move slightly in the direction opposite to that in which it moves to its braking position, to free the blocking means for movement. This may be achieved by providing the braking member with a magnetic element which is attracted to the magnetic material in the ground which operates the device to cause the required unblocking movement of the braking member simultaneously or substantially simultaneously with movement of the trigger means to its triggered position. Alternatively a force may be applied to the blocking means to move it out of abutment with the braking portion.

To protect the device as far as possible from dust the trigger means may be mounted in a first closed chamber defined in part by the first portion and the braking member may be mounted in a second chamber which is open at its lower end to allow the braking member to project therethrough in its braking position. The blocking means may comprise two members, one subject to the trigger member in the first chamber and the other subject to the braking member in the second chamber, the two members being pivotally mounted for joint pivotal movement.

The device may include resetting means. The resetting means may operate magnetically or mechanically.

The trigger means may be biassed to its primed position and return to that position once the device has been operated. With such an arrangement, the resetting means may operate to return the blocking means and braking portion to their blocking and inoperative positions respectively. Where resetting is effect magnetically, both may be provided with magnetic material elements which interact with an externally applied magnetic material element to return both to the required positions. Where resetting is effected mechanically, both may be provided with lateral projections which are engaged by a resetting member. The resetting member may be permanently mounted in the first portion and movable between an inoperative and resetting position by a removable key.

The resetting means may be arranged to move the stabilizing element out of engagement with the trigger means to permit the trigger means to be returned by the resetting means to its primed position, the resetting means simultaneously moving the blocking means back to its blocking position engaging the trigger means and the stabilizing device. Preferably the resetting means is arranged to simultaneously return the braking portion to its inoperative position and the blocking means to its position cooperating with the braking means to prevent the braking means from moving to its braking position and the blocking means to its unblocking position in the absence of the external means.

According to a further aspect of the invention, there is provided a braking device for a wheeled trolley or cart or the like including any feature disclosed herein and not disclosed in my prior International patent application No. WO92/15476.

Further features and advantages of the present invention will become apparent from the following description of an embodiment thereof, given by way of example only, with reference to the accompanying drawings.

DETAILED DESCRIPTION OF THE PREFERRED EMBODIMENT

The braking device shown in the drawings includes a first portion or body 1 and a further portion 2 arranged to move relative to the first portion to effect the braking function by contacting the surface over which the device moves to lift the first portion of the device away from the surface. In the embodiment, the first portion 1 is fixed to a part of a trolley or cart adjacent the surface or ground over which the trolley moves. Preferably, it is fixed to part of a fork 4 of a caster wheel 5 which is rotatable about the axis of fixing means 3, which may be a nut and bolt, by which the wheel 5 is fixed to the fork. The portion 1 may be attached to the fork by the same fixing means.

As shown, the first portion 1 forms a casing in which the movable components of the braking device are housed. Specifically, the first portion 1 is formed with a laterally opening recess 6. The inner part of the recess (see FIG. 4) is closed by a first plate 7 to define a first chamber 8 and the opening of the recess is closed by a second plate 9 to define a second chamber 10 between the two plates 7, 9 and the first portion. The first chamber 8 is closed so as to protect the components housed therein from dust and dirt, but the second chamber 10 is open along its lower periphery, for reasons which will appear.

The further portion or braking member 2 is mounted in the second chamber 10 for angular movement about a pin 11 mounted by its ends in the two plates 7, 9. The centre of gravity of the further portion is offset from the axis of the pin 11 so that gravity biases the further portion to rotate from its inoperative position shown in full lines in FIG. 5, in which the centre of gravity is to one side of the pin, in a clockwise direction to its operative braking position shown in broken lines in FIG. 5, in which part of the portion 2 projects through the open lower periphery of the chamber 10 into contact with the surface 12 on which the castor wheel 5 moves.

Figure 4:
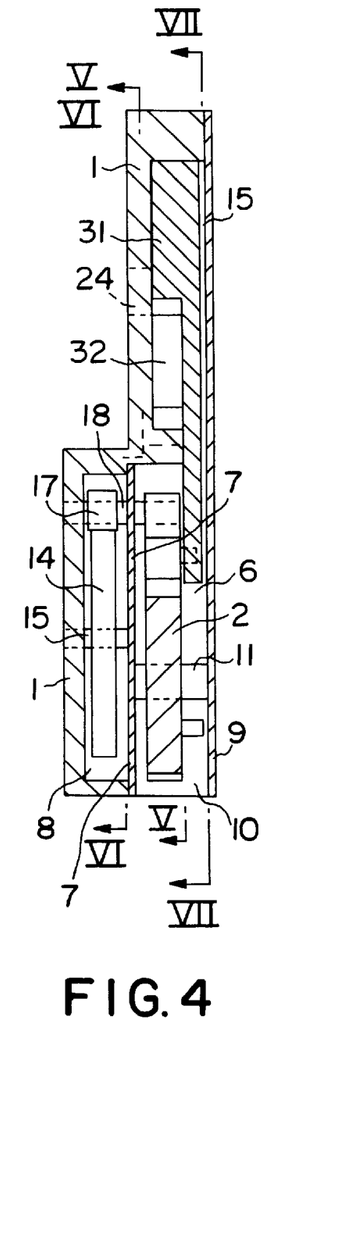
FIG. 4 is a section through the braking device of FIGS. 1 and 2 on the line IV—IV of FIGS. 5 and 6.
Figure 4A:
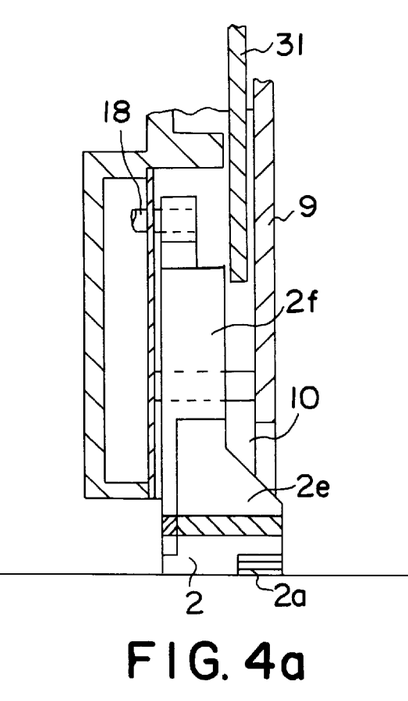
FIG. 4a is a section similar to that of FIG. 4 showing a modification of the braking member its operative braking position.
Figure 5:
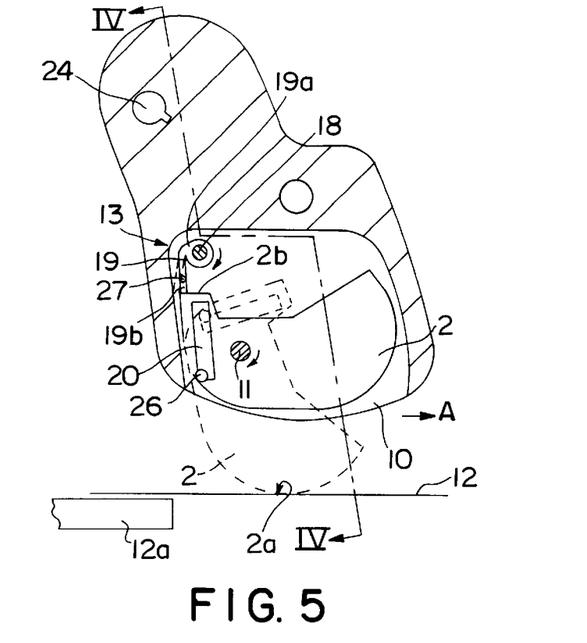
FIG. 5 is a section on the line V—V of FIG. 4.

As shown in FIGS. 4 and 5, the further portion or braking member 2 is in the form of a flat disc and is provided with a high friction finish to grip surface 12 on that part 2a of the periphery which contacts surface 12. To increase the braking effect or adhesion of member 2, the width of the part of the member which contacts surface 12 may be increased as shown in FIG. 4a and that part 2e of the member may be made of rubber and bonded to a rigid plastics component 2f by which it is supported and mounted on shaft 11. This reshaping of member 2 is also designed to counteract the lateral forces applied to member 2 during braking because it is off the axis 3a of the castor wheel on which it is mounted.

Because of the self-aligning action of castor wheels, the castor wheel 5 will track by rotating about its vertical axis 3a to face in the direction of travel, which is shown by arrow A in the drawings. Additionally, portion 2 is arranged so that continued movement of the castor in the direction of arrow A will cause the portion 2 to continue to rotate in the clockwise direction to its fully operative position. Part 2a of the periphery is curved or arcuate but eccentric relative to the axis of pin 11 so that, as the portion 2 rotates in the clockwise direction, the distance between the axis of pin 11 and that region of the peripheral part 2a of portion 2 in contact with surface 12 increases to the point that the castor wheel 5 is lifted off surface 12 so that the trolley is supported on surface 12 by the further portion 2 and not by the associated castor wheel, to thereby impede further progress of the trolley.

Means are provided to limit angular movement of the portion 2 in the direction from its inoperative position to its operative position to ensure that it remains in a fully operative position if attempts are made to continue to push the trolley in the direction A. As shown, the portion 2 is shaped so that in its fully operative position, part of the periphery of portion 2 comes into abutment with part of the wall of portion 1 defining the second chamber to prevent further rotation.

For controlling movement of portion 2 from its inoperative position to its operative position, the device includes retaining means for retaining the braking portion 2 in its inoperative portion. The retaining means includes blocking means 13 which is normally arranged to prevent movement of the further portion 2 from its inoperative position, and trigger means 14 for releasing the blocking means to allow movement of the further portion 2 to its operative position. The trigger means 14 is arranged to be operated by passage of the device in close proximity to, e.g. over, a member of magnetic material. As shown, a strip 12a of magnetic material is arranged in the surface 12, e.g. across the exit to a supermarket or its car park.

Figures 6, 6A:
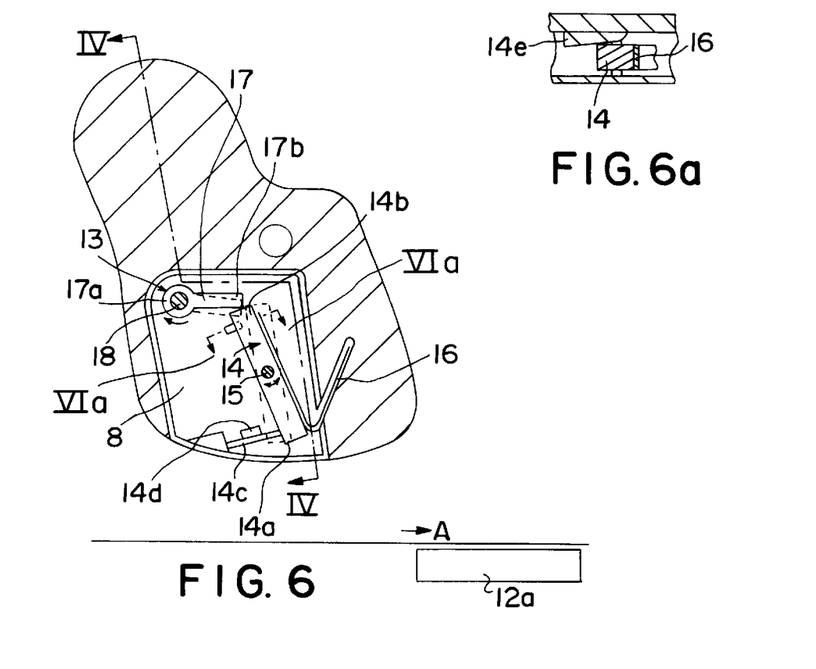
FIG. 6 a section on the line VI—VI of FIG. 4.
FIG. 6a is a section on the line VIa—VIa of FIG. 6.

The trigger means 14 is mounted in the first chamber 8 and includes an elongate member or bar which is normally in a primed position shown in full lines in FIG. 6 and is, preferably, biased to that position. It is deflected from that position as it passes the magnetic material strip 12a. As shown, the trigger member 14 is mounted for pivotal movement about the axis of a pin 15 which passes through the bar substantially centrally between its ends, preferably at the centre of gravity of the bar. The bar extends in the vertical plane but is inclined to the vertical with the lower end 14a extending forwardly in the direction of movement of the device and the upper end 14b extending rearwardly. The bar is biassed to the primed position shown in FIG. 1 by a leaf spring 16 fixed to portion 1.

Figure 1:
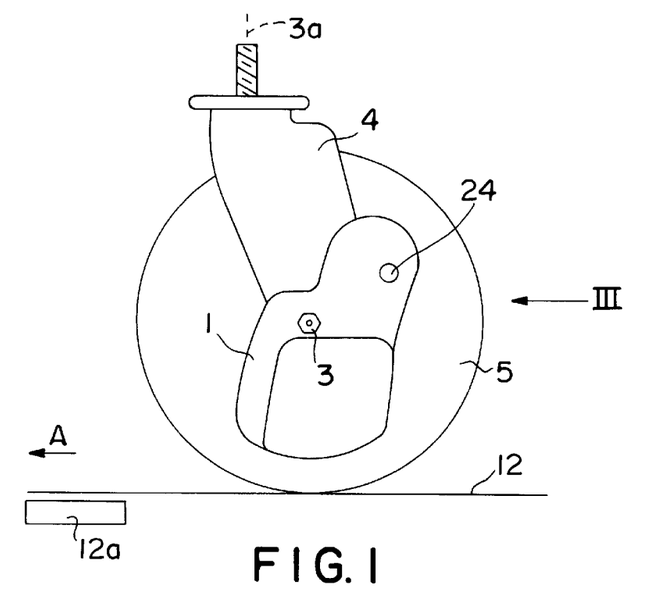
FIG. 1 a side elevation of a castor carrying an embodiment of a braking device according to the present invention, in its inoperative condition.
Figure 2:
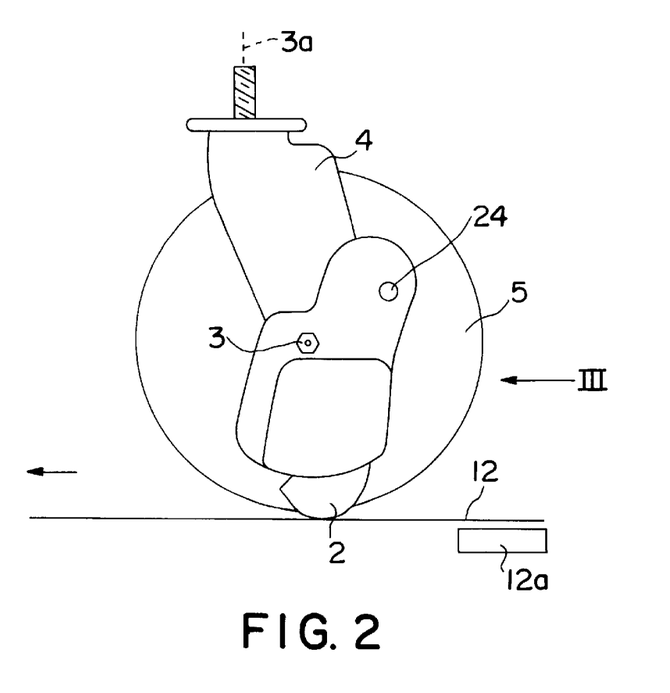
FIG. 2 is a side elevation of the castor of FIG. 1 showing the device in its operative condition.
Figure 3:
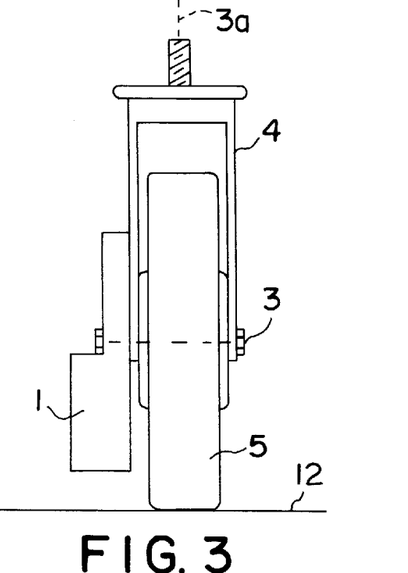
FIG. 3 is a view of the castor of FIG. 1 in the direction of arrow III in FIG. 1.

The member 14, or its lower end 14a, is made of magnetic material such that the lower end will be attracted to the magnetic material strip 12a. As the device passes over the magnetic material strip 12a, the lower end 14a of the member will tend to move relative to portion 1 in a clockwise direction about the axis of pin 15 as shown in FIG. 1, against the bias of the leaf spring 16.

The blocking means 13 includes a first component or member 17 which is arranged in the first chamber 8 and mounted for pivotal movement about the axis of a pin 18 which is fixed in one end 17a of the member. The member 17 extends generally horizontally from the pin 18 and is arranged with its other free end 17b resting on the upper end 14b of the member 14 of the trigger means, the overlap between the two components being such that, when the trigger member 14 is moved from its primed position to its triggered position, the upper end 14b of the member 14 moves clear of the end 17b of the blocking member 17 which is then freed to fall under gravity, rotating in a clockwise direction about the axis of the pin 18.

The blocking means 13 includes a second member 19, fixed to and for rotation with the pin 18 and member 17, which is housed in the second chamber 10 and interacts with the further portion 2 to hold the further portion 2 in its inoperative position when the trigger means is in its primed position. As shown, the member 19 is fixed at one end 19a to the pin 18 and extends generally downwardly from the pin 18, its lower end 19b abutting a surface 2b on the further portion 2 to prevent clockwise rotation of the further portion when the member 19 of the blocking means is in its blocking position. When the first blocking member 17 is released by the trigger member 14, it is freed to rotate in a clockwise direction under gravity. Rotation of member 17 causes the member 19 to rotate in a clockwise direction to move the end 19b of the member out of the path of the further portion 2 which is then free to rotate in a clockwise direction to its operative braking position.

It will be appreciated that, in use of the braking device on a trolley or cart, the braking device will inevitably be subject to jarring and vibration and it has been found essential to ensure that the conditions of normal usage of the trolley or cart will not cause inadvertent operation of the braking device. To this end, the further portion 2 is arranged to cooperate with the blocking means 13 somewhat in the way the trigger means 17 does to prevent freeing of the further portion if the trigger means inadvertently frees the blocking means. As shown, the blocking member 19 is arranged to contact the further portion 2 in such a way that the two are in effect jammed together so that, even if vibration or jarring causes the trigger member 14 to momentarily rotate to its triggered position, engagement between the member 19 of the blocking means and the further portion 2 will maintain member 17 of the blocking means in its upper position permitting the trigger member 14 to return to its primed position with its upper end 14b underneath the end of the blocking member 17. As shown, this jamming is obtained by appropriate shaping of surface 2b. Additionally, because of the offset of the centre of gravity of the further portion 2 from its axis of rotation, the further portion is biased by gravity to bring the contact surface 2b into forced abutment with the end surface of the member 19.

However, the jamming between the further portion 2 and member 19 of the blocking means has to be removed to enable the device to operate when required. For this, the further portion 2 may be slightly rotated in a counter-clockwise direction as or when the trigger member 14 has been moved to its triggered position, so that the blocking means will then be free to move to its unblocking position. To achieve this, the further portion 2 may be provided with an element 20 of magnetic material on the side of the axis of rotation opposite that with the centre of gravity G. This element 20 is intended to interact with the magnetic material strip 12a in the surface 12 so that. as the device is moved over the strip 12a, element 20 is attracted to the strip 12a to rotate the further portion 2 counter-clockwise. At the same time, the trigger member 14 is moved to its triggered position by attraction of its lower end 14b to strip 12a. This frees both of the blocking members to rotate clockwise to remove member 19 from the path of portion 2 which then rotates to its operative position.

Even with this provision to prevent inadvertent operation by jarring or vibration, it is found that, if the device is subject to a shock, e.g., it falls for example when the trolley is taken over a curb, the device may be inadvertently operated. To prevent this, means may be provided for holding or retaining the trigger member 14 in its inoperative position. The means may positively stop or block rotation of the trigger member towards its triggered position and be released as the device passes over the magnetic strip 12a. Alternatively, the means may simply non-positively engage the trigger member to "damp" any tendency on its part to move and so tend to hold it in its inoperative position. Both alternatives are shown in FIG. 6. As shown, the positive retaining means may comprise a non-ferrous spring 14c mounted by one end on the casing portion 1 and arranged with its other end abutting the lower end 14a of trigger member 14 so as to hold the lower end of trigger member 14 against spring 16. The spring 14c carries an element 14d of magnetic material so that, as the device moves over strip 12a, spring 14c is deflected downwardly clear of the lower end of trigger member 14 so that trigger member 14 is free to pivot under the effect of the strip 12a. When the device is returned to its inoperative position strip 14c simply returns to its operative position blocking movement of trigger member 14.

The non-positive retaining means includes a ramp or wedge-shaped portion 14e mounted on or moulded onto the wall of casing portion 1 as shown in FIGS. 6 and 6a. In its inoperative position, the upper end portion 14a of trigger member 14 is engaged by the portion 14e which tends to "damp" any movement of member 14 towards its operative position and therefore tends to retain member 14 in its inoperative position.

Figure 6B:
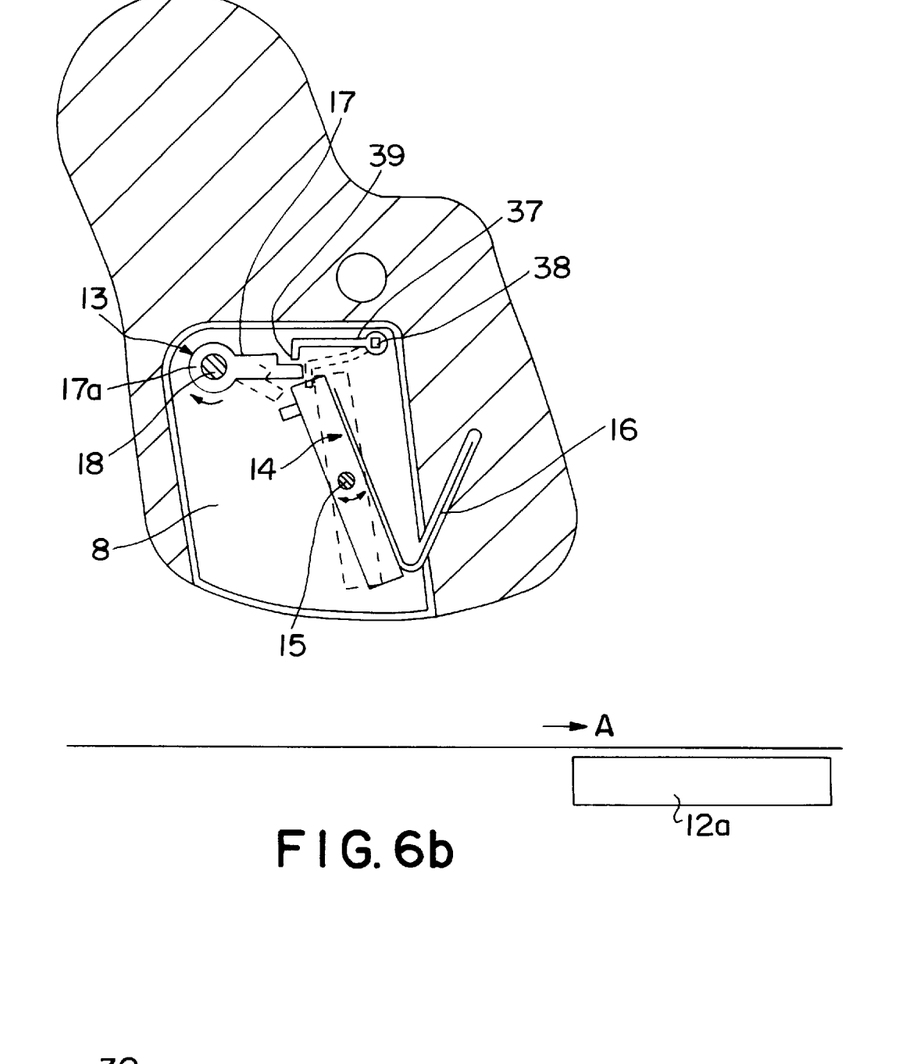
FIG. 6b is a section similar to that of FIG. 6 but including a modification.
Figure 7:
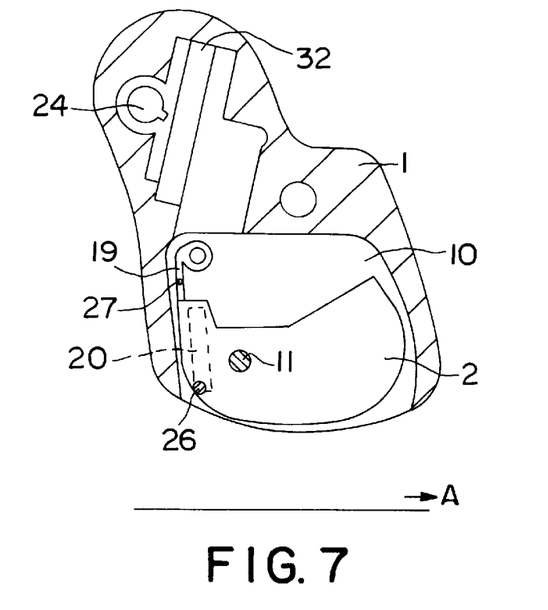
FIG. 7 is a section on the line VII—VII of FIG. 4 but with the resetting member omitted.

To further increase the reliability of operation of the device, a stabilizing device in the form of a pivotal catch 37 may be provided which, as shown in FIG. 6b, in the inoperative condition of the device has its free end 39 resting on blocking member 17. When trigger member 14 moves into its triggered position by passing over a magnetic strip 12a, the catch 37 rotates anti-clockwise about the axis 38 to hold trigger member 14 in its triggered position. Catch 37 may be made of a spring material to be biased in an anti-clockwise direction or may be biased in an anti-clockwise direction by a spring, so that it exerts a force on blocking member 17 such that, once the member 17 is released by the movement of member 14, catch 37 forces member 17 to rotate. The force applied by the catch 37 to the member 17 of the blocking means may be used to force the member 19 out of cooperation with braking portion 2 to release braking portion 2. Element 20 of magnetic material can then be omitted. Catch 37 holds member 14 in its triggered position against anti-clockwise rotation after the force of magnetic strip 12a has been removed. The catch 37 may have very little mass of its own and this reduces the possibility of the member 14 being inadvertently released from engagement by catch 37 by vibration of the device enabling the device to be reset by unauthorised manipulation of the further portion 2.

To enable a trolley or cart to be put back into normal use once the device has been operated, it is necessary to arrange for the device to be able to be reset to its inoperative position. This cannot simply be achieved by manually pushing the further portion 2 back into the chamber 10 in an anti-clockwise direction to its inoperative position because that will not reset the blocking means. Accordingly, the device cannot readily be reset in this way by an unauthorized person who is endeavouring to remove the trolley from the designated area.

The device in the form shown in FIG. 6, ie without catch 37, may be arranged to be reset magnetically by placing a member of magnetic material above the operative parts of the device in a pre-selected position. To achieve magnetic resetting, the further portion 2 is provided with a second element of magnetic material in a position where it will be more strongly attracted to the resetting magnetic member than will the first element 20, and by providing the blocking member 17 with an element of magnetic material or by making the blocking member 17 of magnetic material. When the resetting member is placed above the device, the further portion 2 is rotated anti-clockwise to its inoperative position and at the same time the first blocking member is rotated anti-clockwise to its blocking position. During this movement, the free end 17b of the blocking member 17 contacts the trigger member 14 and pivots it against the bias of spring 16 in a clockwise direction out of its path to its blocking position above the upper end 14b of the trigger member 14. The free end 17b of the blocking member 17 is rounded so that there is a camming action between it and trigger member 14 to facilitate movement of the blocking member to its blocking position. This movement simultaneously caused movement of the second blocking member 19 to its blocking position ready to abut surface 2b of portion 2 as soon as the magnetic resetting member is removed. For convenience, the authorised person may leave the resetting member on top of the device while the trolley is being moved back to the designated area so that when it passes over the magnetic strip 12a at the exit to the designated area, it will not be operated again, but will be retained in its inoperative condition.

However, it is preferred for resetting to be effected mechanically using a key 30 which is inserted into an opening 24 in the first portion 1 to engage with and operate a resetting member 25 which is mounted in the device and movable between an inoperative, withdrawn, position and a resetting position in which the further portion 2 and blocking means 13 are returned to their inoperative position and blocking position respectively.

As shown, the resetting member 25 is mounted in the first portion 1 to be moved linearly into the second chamber 10 to engage with lateral projections 26 and 27 on the further portion 2 and the blocking member 19 respectively to rotate the further portion 2 anti-clockwise from its operative to its inoperative position and to then rotate the member 19 in an anti-clockwise direction from its unblocking position to its blocking position. Rotation of member 19 to its unblocking position rotates member 17 to its position above the trigger member, the trigger member being moved out of the way by the member 17 as it moves to its unblocking position against the bias of the spring 16.

Figure 8:
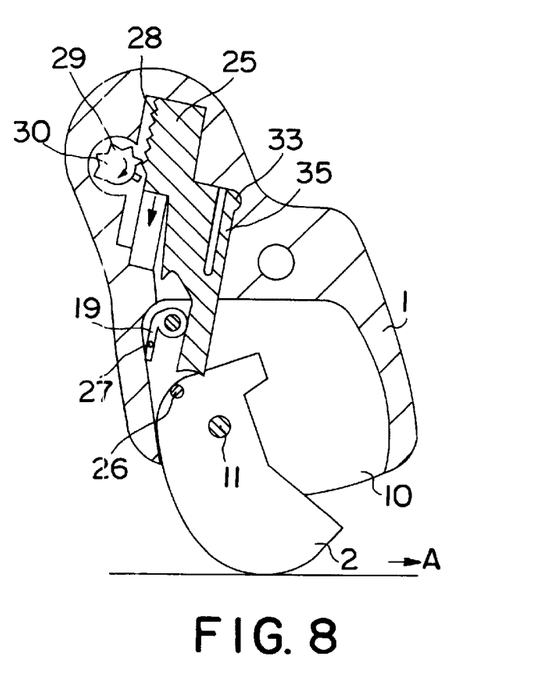
FIG. 8 is a section on the line VIII—VIII of FIG. 4 showing the resetting means in its resetting position.
Figure 9:
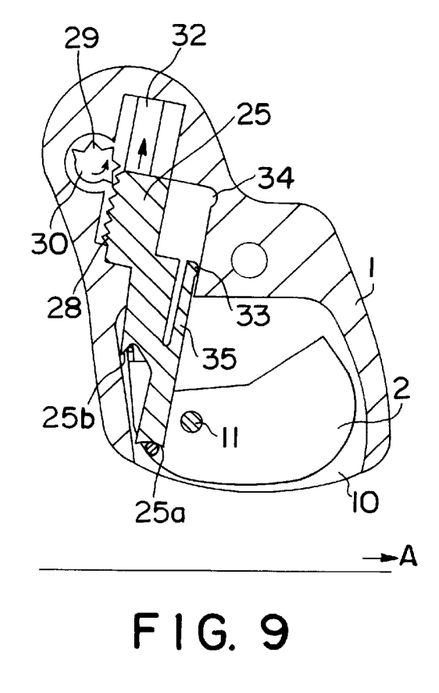
FIG. 9 is a section similar to that of FIG. 8 showing the device in its operative position and the resetting means in its inoperative position.
Figure 10A:
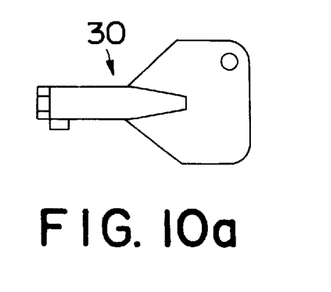
FIGS. 10a and 10b are a plan view and end elevation of a key for the resetting means of FIGS. 9 and 10.
Figure 10B:
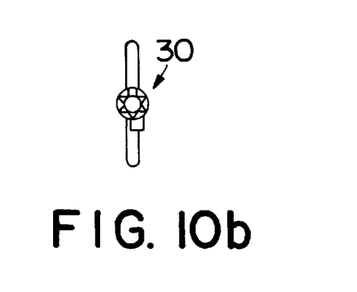

The resetting member 25 carries a rack 28 which is engageable by teeth 29 on the end of a key 30 for moving the resetting member between its withdrawn position (FIG. 8) to a position in which the device is reset (FIG. 9). The device having been reset, the key is then operated to move the resetting member 25 back to its withdrawn position. However, the person operating the key may, to prevent inadvertent operation of the device when the trolley is being returned to the designated area, leave the resetting member in its resetting position until the trolley has been returned to its designated area.

The resetting member 25 is guided in its linear movement between its withdrawn and resetting positions by a spine 31 on that part provided with the rack which is received in and slides along a groove 32 in portion 1. The member 25 is retained in its withdrawn position until engaged and moved by the key, by engagement of a detent 33 in a corresponding notch 34. The detent is provided on the end of a flexible finger 35 which is flexed to permit the detent 33 to move out of the notch 34 when the member 25 is moved to reset the device. The projections 26, 27 are provided on the portion 2 and member 19 in positions to be appropriately engaged by camming surfaces 25a and 25b on member 25 which accommodate relative movement with the respective projection.

Another advantage of the modification shown in FIG. 6b is that, with this modification, the device can only be reset by a positive resetting mechanism, for example as described above. With this resetting mechanism, when the key 30 is rotated it acts (as previously described) through resetting member 25 to bear down on projection 27 and cause the member 17 to rotate anti-clockwise to its reset position. As the member 17 rotates it comes up against the end 39 of catch 37 and forces the catch to rotate clockwise; this releases the member 14 which is returned to its primed position. When the resetting member is returned to its withdrawn position, the device is again ready to be activated.

The first and second portions 1, 2 together with the blocking means 17, 18, 19 and resetting means 25 may be made of any suitable materials. For example, the first portion may be made of zinc, aluminium or plastics. The blocking and resetting members 17, 18, 19, 25, together with the plates 7, 9, may be made of plastics material. The further portion may be made of polyurethane or rubber. Those parts or elements made of magnetic material, such as trigger member 14, may, as previously indicated be made of a material which is attractive to a magnet, such for example as mild steel. The strip 12a is preferably made of a permanently magnetised material or a permanent magnet.

What is claimed is:

1. A braking device for mounting on a vehicle which is movable along a surface, said braking device comprising a first portion for mounting on the vehicle, a braking portion movable relative to the first portion from an inoperative position to an operative braking position in braking contact with the surface, and retaining means for retaining the braking portion in its inoperative position, a portion of the retaining means rebutting a surface of the braking portion to prevent movement of the braking portion, the retaining means being operable in response to the passage of the device in close proximity to external means to release the braking portion, wherein the braking portion and retaining means cooperate to prevent operation of the retaining means to release the braking portion in the absence of the external means, and including means for applying a force to one of the braking portion and the retaining means to remove said cooperation on passage of the device in close proximity to the external means.

2. A braking device as claimed in claim 1, wherein the external means comprise magnetic material, the device being operable by passage in close proximity to the magnetic material to release the braking portion.

3. A braking device as claimed in claim 1, wherein the retaining means includes blocking means and trigger means, the trigger means being movable between a primed position and a triggered position by passage in close proximity to the external means, wherein in the primed position the trigger means holds the blocking means in a blocking position preventing movement of the braking portion and, in moving to its triggered position, the trigger means releases the blocking means to allow movement of the braking portion to its braking position on passage of the device past the external means, the braking portion cooperating with the blocking means to prevent movement of the blocking means from its blocking position to its unblocking position in the absence of the external means.

4. A braking device as claimed in claim 3, wherein said portion of said retaining means has a surface on an end thereof which, in the blocking position of the blocking means, abuts a surface of the braking portion such that the blocking means prevents movement of the braking portion to its braking position and the braking portion prevents movement of the blocking means to its unblocking position.

5. A device as claimed in claim 3, including means for applying a force to the braking portion or the blocking means to release cooperation therebetween and allow movement of the blocking means to its unblocking position and of the braking portion to its braking position.

6. A device as claimed in claim 3, wherein the blocking means is pivotally mounted on the first portion and biased by gravity towards its unblocking position, and the trigger means is pivotally mounted on the first portion and is spring biased towards its primed position.

7. A device as claimed in claim 3, including a stabilizing element which, in the primed position of the trigger means, bears against the blocking means in the region of its contact with the trigger means so that, when the trigger means moves to its triggered position, the stabilizing element engages the trigger means to hold it in its triggered position.

8. A device as claimed in claim 7, wherein when the trigger means moves to its triggered position, the stabilizing element applies a force to the blocking means to release cooperation between the blocking means and the braking portion.

9. A device as claimed in claim 8, including manually operable resetting means for resetting the device following its operation, the resetting means being arranged to move the stabilizing element out of engagement with the trigger means to permit the trigger means to be returned by the resetting means to its primed position, the resetting means simultaneously moving the blocking means back to its blocking position engaging the trigger means and the stabilizing element.

10. A device as claimed in claim 9, wherein the resetting means is arranged to simultaneously return the braking portion to its inoperative position and the blocking means to its position cooperating with the braking means to prevent the braking means from moving to its braking position and the blocking means to its unblocking position in the absence of the external means.

11. A braking device for mounting on a vehicle which is movable along a surface comprising:

a first portion for mounting on the vehicle, a braking portion movable relative to the first portion from an inoperative position to an operative braking position in braking contact with the surface, and retaining means for retaining the braking position in its inoperative position, the retaining means being operable by external means to release the braking portion, said retaining means comprising blocking means and trigger means, the trigger means being movable between a primed position and a triggered position by passage in close proximity to the external means, wherein in the primed position the trigger means holds the blocking means in a blocking position preventing movement of the braking portion and, in moving to its triggered position, the trigger means releases the blocking means to allow movement of the braking portion to its braking position on passage of the device past the external means, the braking portion cooperating with the blocking means to prevent movement of the blocking means from its blocking position to its unblocking position in the absence of the external means, said blocking means comprising a portion having a surface on an end portion which, in the blocking position of the blocking means, abuts a surface of the braking portion such that the blocking means prevents movement of the braking portion to its braking position and the braking portion prevents movement of the blocking means to its unblocking position.

* * * * *